Patented July 26, 1932

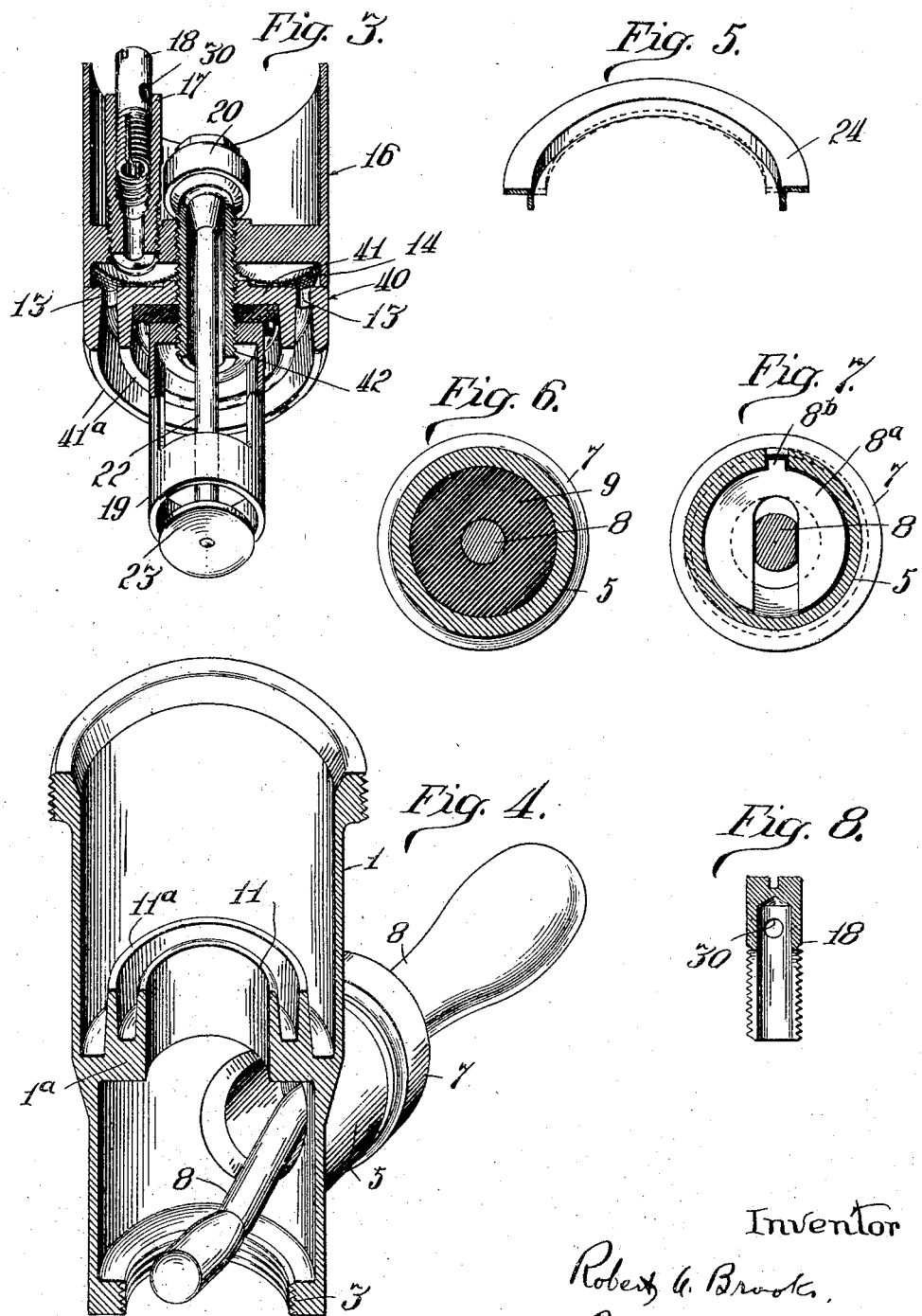

1,868,520

UNITED STATES PATENT OFFICE

ROBERT A. BROOKS, OF CHICAGO, ILLINOIS

FLUSHING VALVE

Application filed September 1, 1927. Serial No. 216,792.

My invention relates to flushing valves of a type in which the main valve is rigidly connected to a plunger or piston which is open on one side to inlet pressure, and on the opposite side within a closed piston chamber is also open through a leak passage to inlet pressure, an auxiliary valve being provided to relieve pressure in the piston chamber and permit discharge of water therein to the outlet passage of the device, whereby operation of the auxiliary valve by suitable manipulating means will bring about an opening movement of the main valve, followed by a slow closing of such valve under the control of the leak passage. In valves of this type connected to a water supply system under high pressure it has been usually necessary to install a stop or controlling valve to control the volume of water discharged into the fixture, and whether a stop valve be used or not the excessive pressure tends to cause whistling and various other objectionable noises. It is the object of my invention to produce a valve which, by means of muffling or baffling members in connection with a stop device for determining the limit of opening movement of the valve permitted, can be adjusted for use with a water supply of either high or low pressure; which will have an extended opening and closing movement, and which will bring about a uniform and smooth closing movement of the valve, without the defects and objections inherent in prior valves of the type under consideration. Other objects of my invention relate to the attainment of advantages incident to the particular construction hereinafter described, and appertain to a nickel screen device especially serviceable for use with a water supply containing suspended particles or mineral matter liable to deposit; a rubber gasket mounting for the operating handle; the construction and arrangement of a cup member and associated parts which constitute the regulating plunger and piston, and other novel and useful details of construction which will be apparent from the description hereinafter given. In the appended claims I have particularly set forth the essential elements of my invention, it being understood, however, that my invention is susceptible of modification and variation, and that the elements recited are intended to include all equivalents and variations in form which come within the true scope and spirit of my invention.

In the drawings, Figure 1 is a vertical central section of my improved valve, with the movable parts in closed position;

Fig. 3 is a perspective of the movable parts of the valve, detached, several of the parts being diametrically sectioned and other parts shown in full;

Fig. 4 is also a perspective view showing the casing in diametrical section and the operating lever in full;

Fig. 5 is a perspective showing a diametrical section of a leather washer member;

Fig. 6 is a cross-section on the line 6—6 of Fig. 1, showing the flexible mounting of the operating lever;

Fig. 7 is a cross-section on the line 7—7 of said Fig. 1, showing the construction of parts for guiding the operating lever in its movements, and Fig. 8 is a diametrical cross-section of a regulating screw used for adjusting the size of a by-pass opening through the retarding piston, detached from other parts.

Like reference characters indicate like parts in all figures of the drawings.

Figure 1:
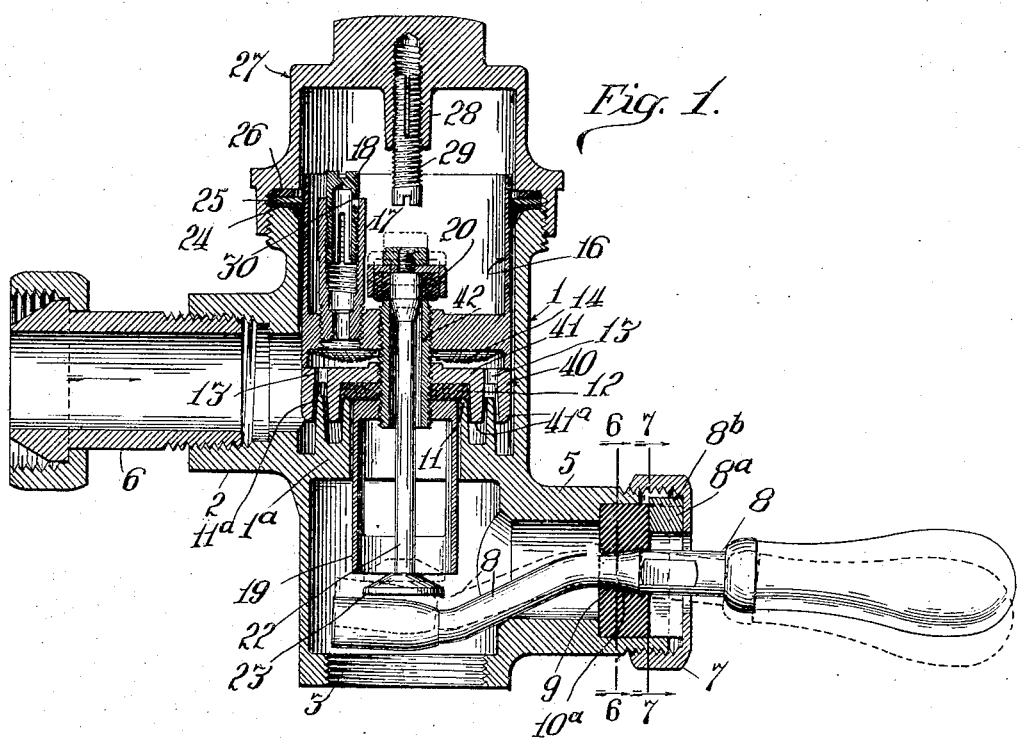
Figure 2:
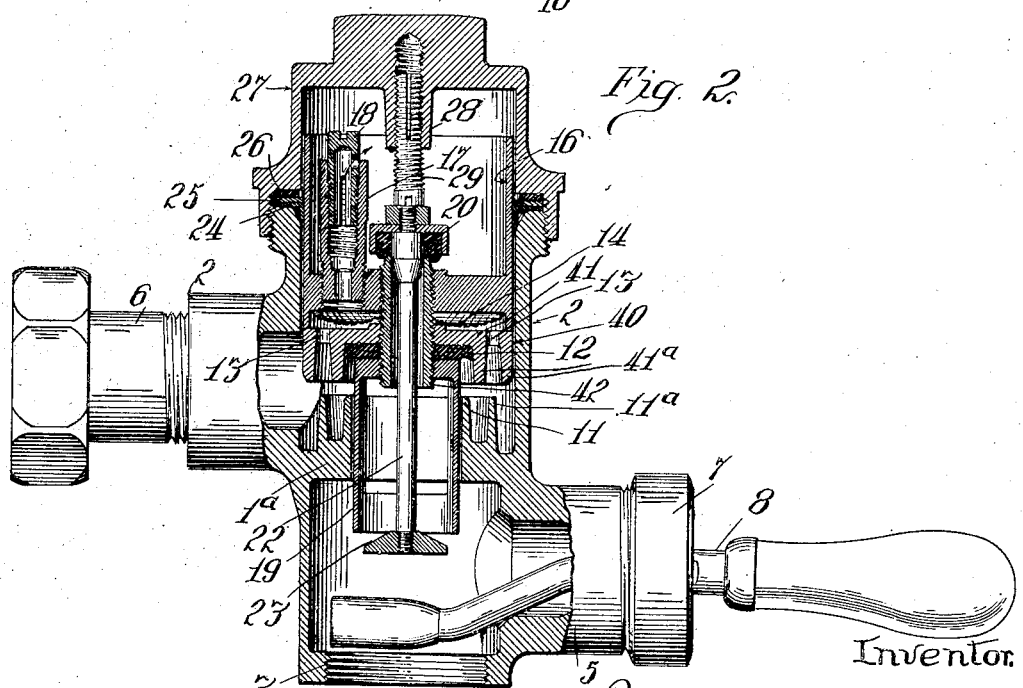
Fig. 2 is a similar section with the main valve open and in uppermost position, the handle being shown in normal lowermost position, to which it will be understood it immediately returns after an operating movement.

Describing now in detail the construction illustrated, the valve body or casing member is formed with an inlet connection 2, internally screw threaded for connection to the service pipe section 6, and a threaded outlet connection 3 for connection to the device to be flushed by the valve, and also with a lever boss 5 arranged to receive and support the operating lever 8. The cylindrical upper part of the valve body is threaded to engage a cap member 27 which is screwed down upon the body against an interposed downwardly-flanged leather washer 24, a brass washer 25 thereabove, and a flat washer 26, the inner margin of the valve body being slightly chamfered to receive the downwardly turned flange of the leather washer. It may here be explained that the cap 27 is chambered to receive and house a cup-shaped retarding piston or plunger member 16 which will later be more fully described and the skirt or side face of which is engaged by the depending portion of the leather washer; and that the latter may consist of an ordinary flat washer formed with a central opening slightly smaller than the diameter of the cup, so that in assembling the parts the washer can be stretched over and around the body of the piston, and the inner edge then crowded downwardly into the chamfer of the body member to form a narrow flange. The outer face of the plunger may be either cylindrical, as shown in Fig. 2, or (and preferably) slightly tapered from the bottom to the top, as shown in Fig. 1. The closed cylindrical or substantially cylindrical space in the body member and cap above the retarding piston constitutes a retarding chamber controlling the closing movement of the piston and a connected main valve.

Between the inlet and outlet passages of the valve the valve body is formed with a partition $1^a$ provided with a main valve seat 11 in alignment with the retarding chamber thereabove in the upper part of the valve body and cap member. Above the valve seat 11 is arranged the main valve 40 comprising a disk 41 secured to a threaded stem 42 and equipped with a leather washer 12 which is clamped against the lower face of the disk by a guide member 19 also making screw-threaded engagement with said stem. As shown in the drawings, the valve disk 41 is formed with depending baffling members in the form of annular ribs $41^a$—$41^a$, and the partition $1^a$ with upwardly extending similar baffling members or ribs consisting of the valve seat member 11 and a rib $11^a$ surrounding it, which intermesh when the valve is in lower position throughout an extended portion of the opening and closing movement of the valve, and which in uppermost position are separated to permit a direct flow of water passing between the separated edges of the ribs from the inlet to the outlet passage of the valve.

Above said valve disk and rigidly connected thereto by said stem 42 is the cup-shaped piston or plunger member 16 above mentioned. This piston is formed with a depending narrow peripheral flange enclosing a shallow screen chamber between the valve disk and plunger member, within which is arranged an annular nickel wire screen 14 which in the present instance is cupped or dished and which provides a large screen area for water passing through by-pass openings 13 in the main valve disk and through said screen into and through an adjustable restricted passageway from the upper portion of the screen chamber into the space above the bottom of the plunger member. This restricted passageway is formed by a threaded sleeve 17 seated in the plunger and engaging a slotted hollow regulating screw 18 formed with a by-pass opening, the capacity of which may be varied by turning the screw.

The upper end of the stem 42 of the connected main valve and plunger is formed to serve as valve seat for an auxiliary starting valve 20 carried by the upper end of an auxiliary valve stem 22 which carries at its lower end a lift plate 23.

Above and in axial alignment with the auxiliary valve stem and valve is arranged a stop screw 29, seated in a boss 28 formed on the under side of the cap member 27. By adjustment of this screw the capacity of the passage permitting direct free flow of water past the separated edges of the baffling ribs $41^a$ and 11 and $11^a$ when the main valve is fully open, and before and after the baffling members leave and re-enter baffling relation during the movement of the valve, may be regulated.

The operating lever 8, provided at its outer end with a suitable handle, is flexibly fulcrumed in a thick heavy rubber washer 9 seated in a recess in the lever boss 5, this washer being compressed and firmly held in its seat by a jam washer $8^a$ having a lug $8^b$ on its outer rim to engage a slot in the lever boss to keep the washer from turning, and by a lock nut 7. The jam washer is formed with a slot having opposed flat faces arranged to slidingly receive a section of the lever which is formed with flat sides, so that the lever is prevented from turning and is guided and limited to a vertical oscillating movement. A portion of the operating lever 8 which passes through the rubber washer 9 is formed with an inclined slightly hollowed or concaved annular face, marked $10^a$, into which the rubber of the washer is compressed by means of the lock nut 7 and jam washer 8, so that the lever is held thereby against endwise displacement. The inner end of the lever underlies both the lift plate 23 of the starting valve stem and the guide member 19 forming part of the main valve structure, so that first the starting valve, and under certain conditions afterward the main valve will be positively lifted from their seats by manipulating the operating handle.

It will be understood that the operating handle is operated to first open the starting valve, relieving the pressure on the upper side of the piston, and that the preponderance in pressure on the lower side of the connected parts will immediately cause the main valve to leave its seat and follow the starting valve upwardly. As the starting valve is further manually lifted there will be, at maximum and a certain range of lower pressures determined by the proportions of the parts, sufficient preponderance of pressure on the lower side of the piston and main valve to cause them to more or less closely follow the starting valve until it brings up against the stop screw 29 and the valve seat at the top of the stem 42 immediately afterward brings up against the starting valve to close passage of water through the valve opening. After the starting valve opening is thus closed, the limited flow of water through the by-pass ports, screen and restricted passageway in the main valve structure to the cup-shaped space in the plunger thereabove will build up pressure on the top side of the main valve until it preponderates above that on the side below (which adjacent the center is directly open to the outlet of the valve), and such valve will gradually fall, at a closing speed determined by the adjustment of the restricted passageway into the retarding chamber.

If the pressure be low, it may occur that the pressure tending to lift the piston and main valve will be balanced by the gravity of the parts before the main valve is lifted by water pressure to a position where the starting valve will be closed, in which case the main valve will be positively lifted by the operating handle to a greater or less extent, and upon release of the operating handle the starting valve will drop to its seat, the pressure then beginning to build up in the retarding chamber and controlling the closing of the main valve, as before described.

If the service pressure be high, the stop screw 29 is adjusted so that the lower edges of the baffling ribs of the main valve in its extreme uppermost or open position against the starting valve when the latter is in contact with the stop screw 29 will stand in a plane a relatively slight distance above the plane of the top edges of the ribs on the partition 1ª in the valve body, or, in the case of extremely high pressure, it may be at or even a trifle below such last mentioned plane. If the service pressure be low, on the other hand, the stop screw is set at a higher level, so that a larger direct passage for the flow of water will result.

In any case, the baffling members are of such extent and so arranged that a direct flushing flow of water through the main valve will not be established until the main valve and piston have traveled a substantial distance and a considerable amount of water has been displaced from the retarding chamber.

Owing to the large volume of water displaced from the retarding chamber the opening through the piston (and through the screen) which permits restoration of this volume during the descent of the piston and valve members may be made larger than in valves of the same general type as heretofore constructed, in which the opening movement when operating at high pressure is necessarily slight, with consequent displacement of only a slight volume of water from the retarding chamber, necessitating a minute leak opening to govern the closing movement of the valve. From this objectionable construction it results that the very small leak passage often becomes clogged up, either by small solid particles in the water, or the precipitation of matter held in solution. A further objection is that even a small foreign particle of matter lodging under the stop valve will permit the passage of a larger volume of water through it than the small by-pass opening will admit into the retarding chamber, and the building up of pressure to close the main valve and seat the main and starting valves firmly is entirely prevented. By my invention a larger by-pass opening is attained, and by the provision of a screen chamber and screen of large size, through which the water must pass slowly, the defects in question are practically overcome.

By adjustment of the stop screw 29 it is obvious that the lift given the main valve and consequently the size of the direct passage from the inlet passage to the main valve opening may be so regulated with respect to pressure in the service pipe that when the operating lever is actuated to open the valve water will flow through it under the particular adjustment at the proper rate and in the proper volume to flush the fixture to which it is connected.

By adjustment of the regulating screw 18 the rate of closing speed of the piston and main valve may be regulated. By proper adjustment, therefore, of the stop screw and regulating screw, both the total quantity of water discharged at a flushing operation and the rate of discharge can be regulated, within limits determined by the proportions of the parts and the service pressure of the supply system.

Inasmuch as the baffling members variably occupy intermeshed baffling relation throughout an extended portion of the opening and closing movement of the main valve, it is obvious that even under an adjustment of the stop 29 for extremely high pressure, permitting a minimum opening and closing movement only, displacement of a substantial volume of water will nevertheless occur in the retarding chamber, and this large displacement, involving, the use of a by-pass opening which is relatively large and free from liability to obstruction, as compared with ordinary practice, results in a smooth, regular and perfect functioning of the valve under high pressure adjustment without the usual defects and disadvantages of valves not so constructed. On the other hand, regulation for extremely low pressure may be made by adjusting the stop 29 to permit more or less of a direct and free flow of water above this baffling range of movement, and this without providing for an undue or excessive total length of valve movement necessary to cover both extremely high pressure and extremely low pressure. Since the operating lever is effective to positively lift both the starting valve and the connected piston and main valve, my improved valve may be used with much lower water pressure than is possible with valves depending on differential pressure alone to operate the piston and open the main valve.

The afterflow or refill in my improved flushing valve takes place as the baffling members enter into intermeshed, baffling relation, after the direct flushing flow has ceased, and is prolonged and diminishes gradually. Inasmuch as the baffling effect increases as the main valve approaches its seat, the valve will seat gently, without any of the objectionable noises common to other valves.

I claim:

1. In a flushing valve of the character described, a casing formed with inlet and outlet passages and a partition between having a main valve seat and a retarding chamber in axial alignment therewith, a piston in said chamber and a main valve contiguous to said piston cooperating with said seat and a screw-threaded axial stem arranged to clamp said piston and valve together, said valve and piston being formed to provide an annular space therebetween forming a screen chamber, an annular screen forming a partition in said chamber said valve and piston being severally orificed on opposite sides of said screen to permit free communication through said valve and restricted communication through said piston, and means for relieving pressure in said retarding chamber.

2. A flushing valve structure according to claim 1 in which said screen is an annular member arcuate in radial section.

3. A flushing valve structure according to claim 1 in which said screen is a nickel wire member.

4. In a flushing valve having a casing and a valve and elements therein arranged for manual operation, operating means including a lever having a portion inside said casing arranged to cooperate with said valve elements, a handle outside said casing, and a heavy rubber gasket fixed in said casing engaging said lever and constituting a flexible fulcrum therefor.

5. Operating means for flushing valves according to claim 4 in which said rubber gasket is seated in a lever boss and confined by a jam washer and a lock nut, said washer being formed with a slot having opposite faces providing a guide for said lever.

6. Operating means for flushing valves according to claim 4 in which the portion of the operating lever contiguous to said rubber gasket is formed with an annular concaved face, and having means for compressing the gasket into said concaved face.

7. A flushing valve structure including a casing formed with inlet and outlet passages and a partition therebetween having a main valve seat and a cylindrical retarding chamber in axial alignment with said seat, a connected main valve and piston comprising a main valve member and a cup-shaped retarding piston and a hollow stem connecting said valve and piston and a guide member secured to said stem below said valve, the upper end of said stem being formed as an auxiliary starting valve seat and said partition and said main valve being provided with baffling members arranged to variably occupy intermeshed baffling relation throughout an extended portion of the opening and closing movement of the main valve to permit substantially unobstructed flow of water when said valve is in fully open position, an auxiliary starting valve having a depending stem, and a manually operable lever arranged to cooperate both with said depending stem and said guide member.

8. A flushing valve structure including a casing formed with inlet and outlet passages and a partition therebetween having a main valve seat and a cylindrical retarding chamber in axial alignment with said seat, a connected main valve and piston comprising a main valve member and a cup-shaped retarding piston and a hollow stem connecting said valve and piston and a guide member secured to said stem below said valve, the upper end of said stem being formed as an auxiliary starting valve seat and said partition and said main valve being provided with baffling members arranged to intermesh as the valve leaves and approaches closed position to permit substantially unobstructed flow of water when the valve is in fully open position, an adjustable stop arranged to limit the opening movement permitted said main valve, an auxiliary starting valve having a depending stem, and a manually operable lever arranged to cooperate both with said depending stem and said guide member.

9. A flushing valve structure including a casing formed with inlet and outlet passages and a partition therebetween, a main valve seat and a retarding chamber in axial alignment therewith, a piston in said chamber and a main valve secured to said piston, said retarding chamber being in communication with said inlet passage through an adjustable by-pass opening, and said connected main valve and piston member being formed with a starting valve seat and a communicating passage through said valve and piston member, a manually operable starting valve arranged to cooperate with said starting valve seat, baffling means including members secured severally to said valve and said casing and arranged transversely to the line of flow of water passing through the casing, said members in extreme open position permitting substantially direct unobstructed flow of water and being arranged to occupy baffling position throughout an extended portion of the opening and closing movement of the main valve whereby displacement of a substantial volume of water in the retarding chamber will occur at low pressure under large by-pass adjustment during the traverse of said main valve through baffling position, and an adjustable stop in the path of movement of said starting valve; substantially as and for the purpose described.

10. A flushing valve structure including a casing formed with inlet and outlet passages and a partition therebetween, a main valve seat and a retarding chamber in axial alignment therewith, a piston in said chamber and a main valve secured to said piston, said retarding chamber being in communication with said inlet passage through an adjustable by-pass opening, and said connected main valve and piston member being formed with an axial passage therethrough and a starting valve seat at the top of said passage, a starting valve cooperating with said starting valve seat and having a depending stem extending through said axial passage, an operating lever for actuating said starting valve stem, baffling means including members secured severally to said valve and said casing and arranged transversely to the line of flow of water passing through the casing, said members in extreme open position permitting substantially direct unobstructed flow of water and being arranged to occupy baffling position throughout an extended portion of the opening and closing movement of the main valve, whereby displacement of a substantial volume of water in the retarding chamber will occur at low pressure under large by-pass adjustment during the traverse of said main valve through baffling position, and an adjustable stop in the path of movement of said starting valve; substantially as and for the purpose described.

11. A flushing valve structure including a casing formed with inlet and outlet passages and a partition therebetween, a main valve seat and a retarding chamber in axial alignment therewith, a piston in said chamber and a main valve secured to said piston, said retarding chamber being in communication with said inlet passage through an adjustable by-pass opening, and said connected main valve and piston member being formed with an axial passage therethrough and a starting valve seat at the top of said passage, a starting valve cooperating with said starting valve seat and having a depending stem extending through said axial passage, baffling means including members secured severally to said valve and said casing and arranged transversely to the line of flow of water passing through the casing, said members in extreme open position permitting substantially direct unobstructed flow of water and being arranged to occupy baffling position throughout an extended portion of the opening and closing movement of the main valve whereby displacement of a substantial volume of water in the retarding chamber will occur at low pressure under large by-pass adjustment during the traverse of said main valve through baffling position, an operating lever arranged to positively open said starting valve and said main valve in succession, and an adjustable stop in the path of movement of said starting valve; substantially as and for the purpose described.

12. A flushing valve structure including a casing formed with inlet and outlet passages and a partition there-between, a main valve seat and a retarding chamber in axial alignment therewith, a piston in said chamber and a main valve secured to said piston, said retarding chamber being in communication with said inlet passage through a restricted opening, means for relieving pressure in said retarding chamber, baffling means including members secured severally to said valve and said casing and arranged transversely to the line of flow of water entering the casing, said members in extreme open position permitting substantially direct unobstructed flow of water and being arranged to occupy baffling position throughout an extended portion of the opening and closing movement of the main valve, whereby displacement of a substantial volume of water in the retarding chamber will occur at low pressure under large by-pass adjustment during the traverse of said main valve through baffling position and adjustable stop means for limiting the opening movement permitted said main valve; substantially as and for the purpose described.

13. A flushing valve structure including a casing formed with inlet and outlet passages and a partition there-between, a main valve seat and a cylindrical retarding chamber in axial alignment therewith, a piston in said chamber and a main valve secured to said piston, said retarding chamber being in communication with said inlet passage through a restricted opening, means for relieving pressure in said retarding chamber, and baffling means including baffling members consisting of concentric ribs on the inlet side of said partition extending transversely to the line of flow of water passing through said inlet passage of the casing to said main valve seat and concentric baffling members on said valve arranged to intermesh with said first mentioned baffling members throughout an extended portion of the opening and closing movement of said valve whereby displacement of a substantial volume of water in the retarding chamber will occur at low pressure under large by-pass adjustment during the traverse of said main valve through baffling position, said baffling members permitting direct flow of water past their separated edges when the main valve is in open position, and adjustable stop means for limiting the opening movement permitted said main valve; substantially as and for the purpose described.

In testimony whereof I have subscribed my name.

ROBERT A. BROOKS.